July 1, 1924.
A. R. ANDERSEN
CAR BRAKE
Filed March 17, 1923   2 Sheets-Sheet 1
1,499,439
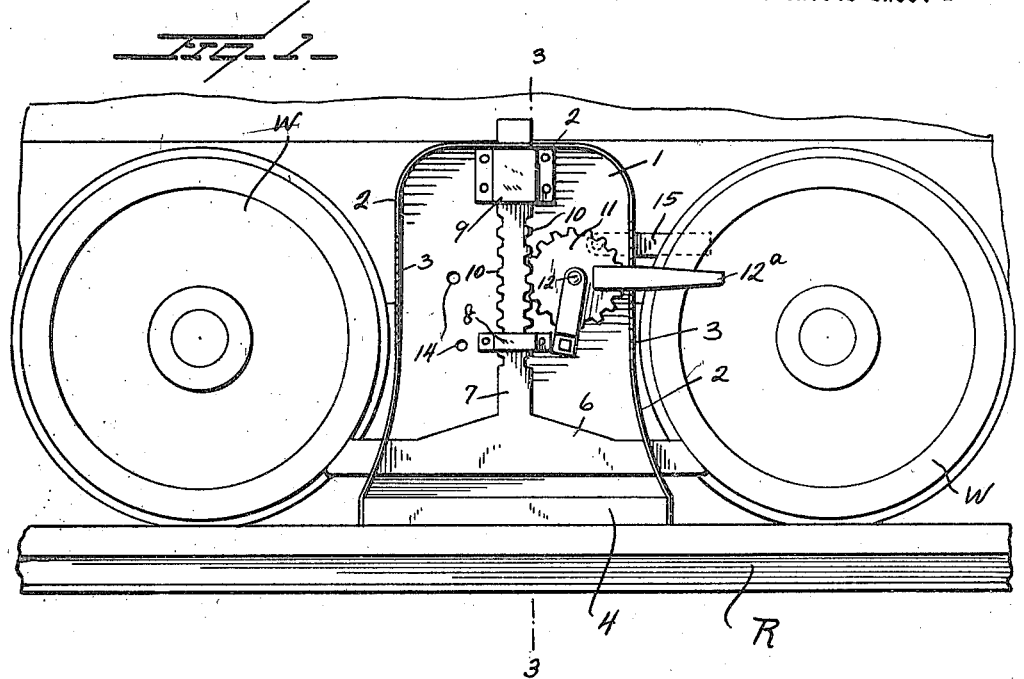
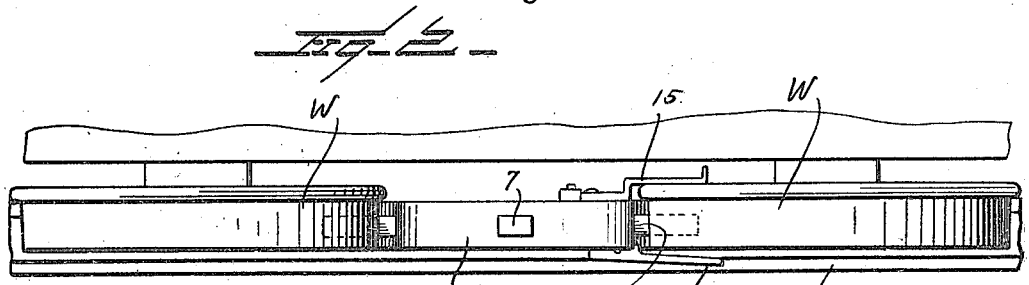
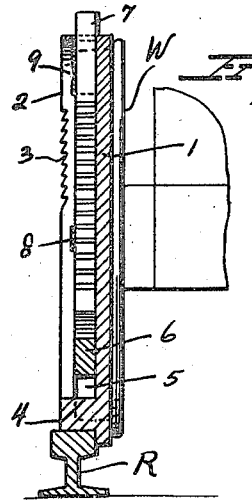
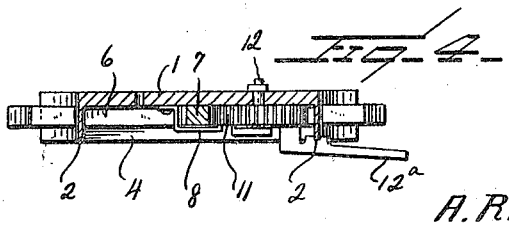
INVENTOR.
A. R. Andersen
BY Watson E. Coleman
ATTORNEY.

July 1, 1924.
A. R. ANDERSEN
CAR BRAKE
Filed March 17, 1923   2 Sheets-Sheet 2
1,499,439
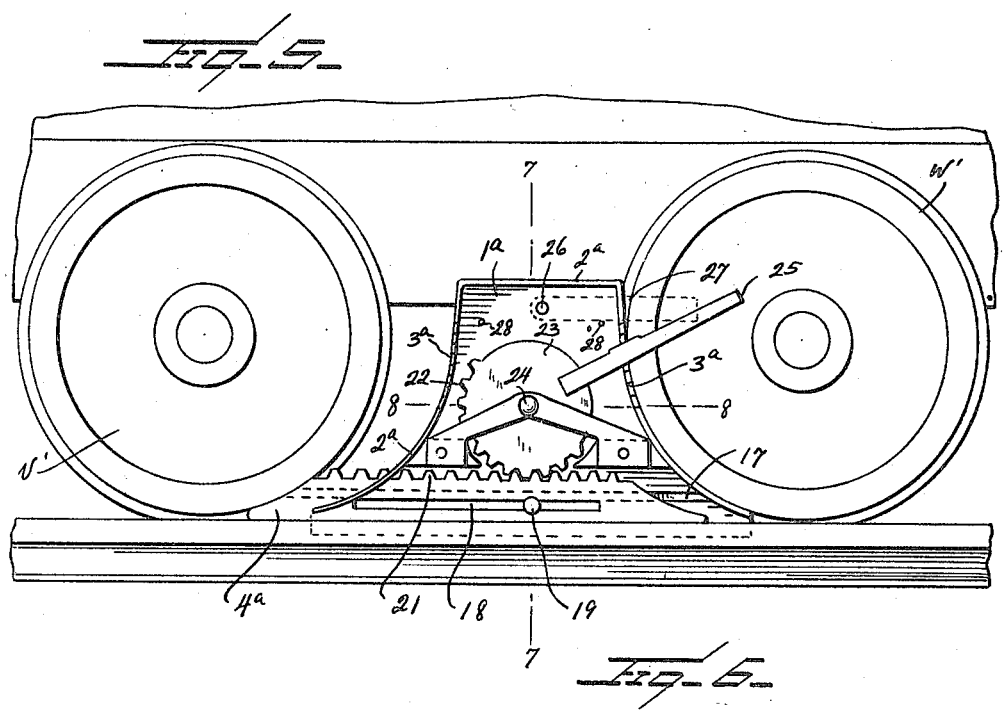
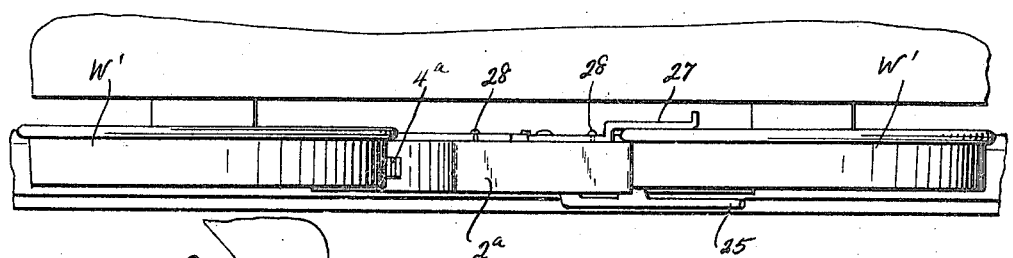
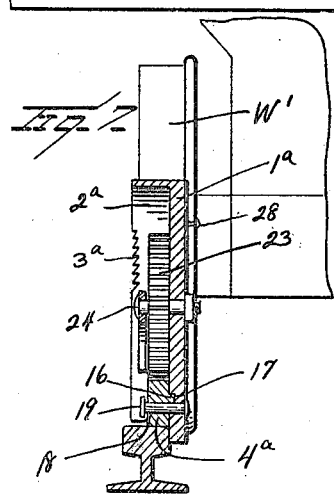
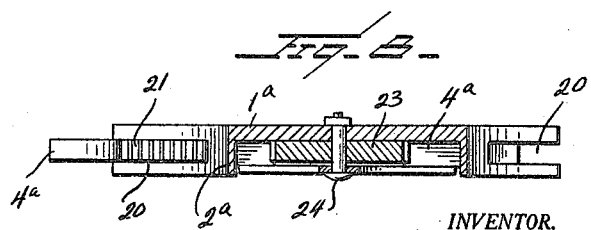
INVENTOR.
A. R. Andersen
BY Watson E. Coleman
ATTORNEY.

Patented July 1, 1924.

1,499,439

UNITED STATES PATENT OFFICE.

ALFRED R. ANDERSEN, OF ROCK SPRINGS, WYOMING.

CAR BRAKE.

Application filed March 17, 1923. Serial No. 625,829.

*To all whom it may concern:*

Be it known that I, ALFRED R. ANDERSEN, a citizen of the United States, residing at Rock Springs, in the county of Sweetwater and State of Wyoming, have invented certain new and useful Improvements in Car Brakes, of which the following is a specification, reference being had to the accompanying drawings.

This invention relates to certain improvements in car brakes and has relation more particularly to a brake of this general character especially designed and adapted for use in connection with mine or kindred cars and it is an object of the invention to provide a brake having novel and improved means whereby, when the same is applied, the car may have desired travel down an inclined trackway without the use of sprags or the like.

Another object of the invention is to provide a novel and improved brake which is adapted to coact with the wheels of a car at one side thereof and the associated rail of a trackway and in a manner whereby said wheels are raised out of contact with said rail so that the brake has sufficient frictional contact with the rail to properly retard the travel of the car and especially down an incline.

The invention consists in the details of construction and in the combination and arrangement of the several parts of my improved car brake whereby certain important advantages are attained and the device rendered simpler, less expensive and otherwise more convenient and advantageous for use, as will be hereinafter fully set forth.

The novel features of my invention will hereinafter be definitely claimed.

In order that my invention may be the better understood, I will now proceed to describe the same with reference to the accompanying drawings, wherein:—

Figure 1 is an elevational view of a brake constructed in accordance with an embodiment of my invention and in applied position, the associated car being illustrated in fragment;

Figure 2 is a view in top plan of the structure as illustrated in Figure 1;

Figure 3 is a sectional view taken substantially on the line 3—3 of Figure 1;

Figure 4 is a transverse sectional view taken through the upper portion of my improved brake as herein disclosed;

Figure 5 is a view similar to Figure 1 but illustrating a brake constructed in accordance with a further embodiment of my invention;

Figure 6 is a view in top plan of the structure as illustrated in Figure 5;

Figure 7 is a sectional view taken substantially on the line 7—7 of Figure 5;

Figure 8 is a transverse sectional view taken through the upper portion of the brake as illustrated in Figure 5.

As disclosed in Figures 1 to 4 inclusive, my improved brake denotes a plate 1 of requisite dimensions and which has its side and top marginal portions defined by the outstanding flanges 2, the side flanges 2 being each provided at a desired point thereon with the holding teeth 3 for a purpose to be hereinafter more particularly referred to.

Carried by the lower portion of the plate 1 and extending entirely thereacross is a shoe 4 adapted, when the brake is in applied position, to have direct contact with the rail R. The lower portion of each of the flanges 2 is provided with a slot 5 through which extends an end portion of a bar 6. The central portion of the bar 6 is provided with an upstanding arm 7 freely disposed through the guides 8 and 9 suitably secured to a face of the plate 1. The arm 7 is also freely disposed through the upper flange 2.

The opposite marginal portions of the arm 7 are toothed as at 10 and engageable with the teeth 10 of one side of the arm 7 is a gear 11 rotatably supported as at 12 by the plate 1. Secured to and extending outwardly from the gear 11 is an operating arm 12$^a$ whereby the requisite rocking or rotary movement may be imparted to the gear 11.

My improved brake is particularly adapted for use to retard the travel of a mine car or the like down an incline. Before the car reaches the incline my improved brake is arranged upon the rail R between the wheels W at one side of the car and, the arm 12$^a$ is moved in a direction to cause the gear 11 to impart upward movement to the arm 7. As the arm 7 moves upwardly the extremities of the bar 6 engage the treads of the wheels W from below and at the same time the shoe 4 is forced into firm contact with the rail R. The arm 7 is adapted to be moved upwardly a distance to raise the wheels W out of contact with the rail R so that the adjacent side of the car is supported directly by the applied brake so that as the car travels down an incline the resultant friction between the shoe 4 and the rail R will effectively retard the travel of the car.

The gear 11 is effectively held against rotation and particularly when the side of the car has been raised by having said operating arm 12ᵃ engaged with one of the teeth 10. The gear 11 may be arranged at either side of the arm 7 as preferred and for which reason the opposite sides of the bar 7 are provided with the teeth 10. The openings 14 in Figure 1 are to provide means whereby the gear 11 may be readily mounted at the side of the bar 7 opposite to that illustrated. Pivotally engaged with the inner or rear face of the plate 1 is a rock arm 15 which as is illustrated in Figures 1 and 2 is adapted to extend and engage the rear face of an adjacent wheel W whereby the brake in its entirety is effectively maintained in working position.

In the embodiment of my invention as illustrated in Figures 5 to 8 inclusive the plate 1ᵃ has its side margins so formed as to snugly engage the tread of a wheel from below as is illustrated in Figure 5, the side and upper edges of said plate 1ᵃ being also defined by the outstanding flanges 2ᵃ.

The shoe 4ᵃ is separable from the plate 1ᵃ and has its rear face provided therealong with an outstanding flange or rib 16 which engages within a slot 17 produced in the adjacent face of the plate 1ᵃ. By this means the shoe 4ᵃ is supported for sliding movement. The shoe 4ᵃ is also provided in its central portion with a slot 18 extending along the major portion of the shoe 4ᵃ and through which is directed a headed member 19 carried by the plate 1ᵃ and whereby the shoe 4ᵃ is effectively maintained in applied position. The lower portion of each of the side flanges 2ᵃ is provided with a slot 20 through which an end portion of the shoe 4ᵃ is adapted to be projected in order to engage a wheel W' from below. When the shoe 4ᵃ is forced into desired engagement with a wheel W' the side of the plate 1ᵃ and the flange 2ᵃ carried thereby remote therefrom is engaged with the second wheel W' whereby the desired raising of the car is facilitated.

The upper face of the shoe 4ᵃ is provided with a rack 21 with which meshes the arcuate rack 22 carried by a disc 23. The disc 23 is rotatably supported as at 24 by the plate 1ᵃ.

Fixed to and extending outwardly from the disc 23 is an operating arm 25 whereby the requisite rotation may be imparted to the disc 23 to project or retract the shoe 4ᵃ as required. The disc 23 is held against movement by causing the arm 25 to engage one of the teeth 3ᵃ suitably arranged on the side flanges 2ᵃ.

Pivotally engaged as at 26 with the rear face of the plate is a rock arm 27 of a length to extend rearwardly of and to engage a wheel W' to maintain the brake in applied position. Any suitable means may be provided to limit the downward swinging movement of the arm 27 but as herein disclosed I provide the outstanding pin 28 carried by the plate 1ᵃ.

In practice, my improved brake is not attached or secured to any part of the car structure. When it is desired to brake the car for travel down an incline, a brake is set by a workman upon a rail between a pair of adjacent wheels W or W' and an arm 12ᵃ or 25 is operated to raise said adjacent wheels W or W' so that the travel of the car down the incline will be retarded by the frictional contact of the brake upon a rail and particularly by the weight of the car upon the brake resulting from such raising of the wheels. The brake, in practice, may be readily applied while the car is in motion although if preferred it can be brought to a standstill at the top of the incline.

From the foregoing description it is thought to be obvious that a car brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim: —

1. A brake of the class described adapted to engage a rail of a trackway and the wheels of a car travelling on said trackway to raise the adjacent side of a car, said brake being entirely separate from the car.

2. A brake of the class described adapted to engage a rail of a trackway and the wheels of a car travelling on said trackway to raise the adjacent side of a car, said brake including a shoe having direct contact with the rail, said brake being entirely separate from the car.

3. A brake of the class described adapted to engage a rail of a trackway and the wheels of a car travelling on said trackway to raise the adjacent side of a car, and means carried by the brake and engageable with a car wheel for forcing the brake in applied position, said brake being entirely separate from the car.

4. A brake of the class described comprising a plate adapted to be positioned between adjacent wheels of a car, a shoe carried by the plate for direct contact with a rail, and means for raising said wheels from the rail, said brake being entirely separate from the car.

5. A brake of the class described adapted to engage a rail of a trackway and being arranged between adjacent wheels of a car, said brake comprising a member adapted to be positioned upon the rail between said wheels, and means carried by said member and engageable with the wheels for raising the same from the trackway and supporting such wheels in such position.

6. A brake of the class described adapted to engage a rail of a trackway and being arranged between adjacent wheels of a car, said brake comprising a member adapted to be positioned upon the rail between said wheels, means carried by said member and engageable with the wheels for raising the same from the trackway and supporting such wheels in such position, and means carried by said member and adapted to overlie a face of a wheel to hold the member in working position.

7. A brake of the class described adapted to engage a rail of a trackway and being arranged between adjacent wheels of a car, said brake comprising a member adapted to be positioned upon the rail between said wheels, means carried by said member and engageable with the wheels for raising the same from the trackway and supporting such wheels in such position, and a rock arm carried by the member and adapted to engage a face of a wheel to hold the member in working position.

In testimony whereof I hereunto affix my signature.

ALFRED R. ANDERSEN.